United States Patent [19]
Aoki

[11] 4,105,391
[45] Aug. 8, 1978

[54] INJECTION BLOW MOLDING MACHINE

[76] Inventor: Katashi Aoki, 6037, Ohaza Minamijo, Sakakimachi, Hanishina-gun, Japan

[21] Appl. No.: 775,836

[22] Filed: Mar. 9, 1977

[30] Foreign Application Priority Data

Mar. 12, 1976 [JP] Japan ............................ 51-026908

[51] Int. Cl.² .......................................... B29D 23/03
[52] U.S. Cl. .................................. 425/526; 425/540
[58] Field of Search ............... 425/533, 534, 529, 526, 425/538, 540

[56] References Cited
U.S. PATENT DOCUMENTS

| | | | |
|---|---|---|---|
| 3,694,124 | 9/1972 | Saumsiegle et al. | 425/533 |
| 3,850,562 | 11/1974 | Takeuchi et al. | 425/533 X |
| 3,985,485 | 10/1976 | Farrell | 425/533 X |

Primary Examiner—Richard B. Lazarus
Attorney, Agent, or Firm—Weingarten, Maxham & Schurgin

[57] ABSTRACT

An injection blow molding machine which is compact but effective in operation. The machine comprises: a machine bed being provided with an injection molding stage having an injection mold and a mold closing mechanism, a heating stage having a heating cylinders, a stretching and blowing stage having a stretching and blowing mechanism and a releasing stage having a molded product releasing mechanism; a base plate which is attached to and above the machine bed leaving a certain space; a rotary disk which is rotatably attached to the under-surface of the base plate; a motor secured to the middle portion on the base plate and interlocked with the rotary disk by an arm and a connecting pin. The invention is characterized in that the space between the machine bed and the base plate carrying the rotary disk is fully utilized for holding mold and other necessary parts.

4 Claims, 10 Drawing Figures

INJECTION BLOW MOLDING MACHINE

BACKGROUND OF THE INVENTION

This invention relates to an improved injection blow molding machine. More particularly, the invention relates to an injection blow molding machine of the type in which the processes from the injection molding of parisons to the ejecting of molded products through heating, stretching and blowing of the parisons can be carried out consecutively.

In the conventional injection blow molding machine of this type having a rotating mechanism, injection molded parisons are transferred into heating, stretching and blowing stages in order, so that rotating members are rotatably supported by the supporting shaft which is secured to the center of machine bed. Accordingly, the diameter of the space occupied by the rotating members becomes inevitably large. Further, since the supporting shaft and rotating members are disposed in the middle portion of the machine, the space between the machine bed and the rotating members has never been utilized effectively. Therefore, the overall size of the injection blow molding machine of this type in the conventional art becomes large.

BRIEF SUMMARY OF THE INVENTION

It is, therefore, the primary object of the present invention to eliminate the above disadvantages caused to occur in the conventional art.

Another object of the present invention is to provide a new and improved injection molding machine, in which a rotary disk as a rotating member is supported on the under-surface of a base plate that is disposed above the machine bed leaving a certain space therebetween. Therefore, the disadvantages caused in the conventional type machine having rotating members attached to the middle portion of machine bed, can be removed.

A further object of the present invention is to provide an injection blow molding machine of the type described above in which the space between the machine bed and the rotary disk is effectively utilized.

Still a further object of the present invention is to provide an injection blow molding machine which is small and compact but effective in operation.

In accordance with the aspects of the present invention, the injection blow molding machine comprises: a machine bed having four operation stages of an injection molding stage, a heating stage, a stretching and blowing stage and a releasing stage; a base plate which is attached with its peripheral portions in parallel to and above the machine bed; a rotary disk which is rotatably attached to the under-surface of the base plate and being provided with neck molds; a motor secured to the middle portion on the base plate and having an arm member and a connecting pin to rotate the rotary disk intermittently to the respective operation stages; a mold closing mechanism, a heating core inserting mechanism, a stretching and blowing mechanism and a molded product releasing mechanism which are secured on the base plate and positioned respectively in the above injection molding, heating, stretching and blowing, and releasing stages; and an injection mold, blow molds and heating cylinders which are disposed in the space between the machine bed and the base plate.

Further, the above operation mechanisms are brought into operation by their respective hydraulic mechanisms when the rotary disk is stopped at the predetermined position. The mold closing mechanism is provided with parison cores which are inserted into the cavities of the injection mold. The heating mechanism is provided with heating cores which are inserted into heating cylinders. The stretching and blowing mechanism is provided with stretching and blowing cores which are inserted into the blow molds. The releasing mechanism is provided with blow-off tubes to eject the blow molded products. The above cores and tubes are vertically moved in their respective operation stages by means of their respective hydraulic cylinders.

The above-mentioned injection mold is connected to the upper end of the ram of a mold clamping cylinder which is secured to the machine bed and vertically moved toward and from the neck mold that is secured to the rotary disk.

In accordance with the present invention, since the rotating device is not attached the machine bed, the space above the machine bed can be fully utilized for furnishing the space with the injection mold, blow molds, heating cylinders and other parts. Therefore, the injection blow molding machine of the present invention can be made small and compact without any disadvantages as compared with conventional type machines.

BRIEF DESCRIPTION OF THE DRAWINGS

These and other objects and features of the invention will become more apparent to those skilled in the art from the following description taken in connection with the accompanying drawings, in which.

DESCRIPTION OF THE PREFERRED EMBODIMENT

Referring now to the accompanying drawings, the details of the embodiment of the present invention will be described in the following.

The injection blow molding machine of the invention is devised to carry out the continuous production process from injection step to heating, stretching and blowing steps. The molding machine 1 is provided with a machine bed 2, a base plate 3 which is disposed above the machine bed 2 leaving a predetermined space, and a rotary disk 4 which is rotatably fitted to the under-surface of the base plate 3. The space between the machine bed 2 and the base plate 3 is utilized as a molding space. The rotary disk 4 is turned for every 90 degrees, at which are formed an injection molding stage A, a heating stage B, a stretching and blowing stage C and a releasing stage D.

Figure 2:
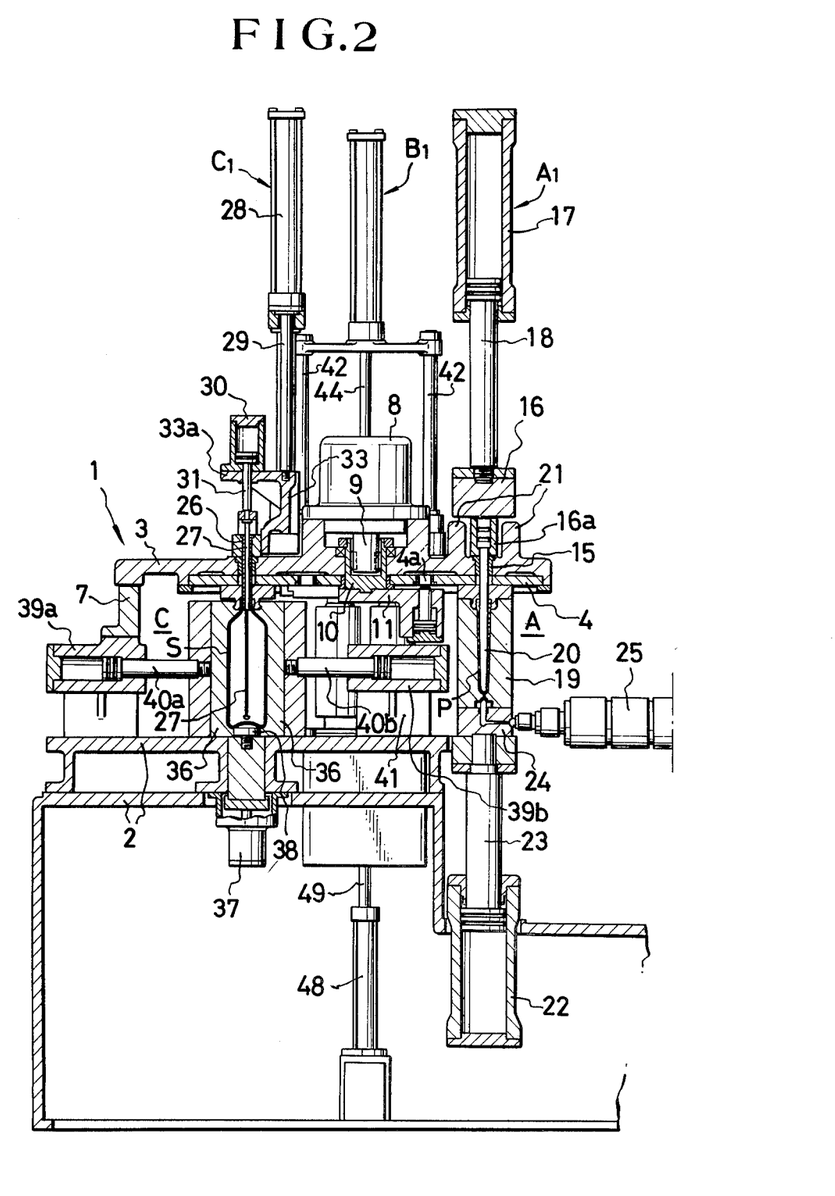
FIG. 2 is a vertical sectional view of the same taken on the line II—II in FIG. 1.

The above-mentioned base plate 3 is attached to a pair of tie rods 5 which are set up in the injection molding stage A of the machine bed 2 (see FIG. 4) and to supporting cylinders 6 which enclose the tie rods 5. Further, the other side of the base plate 3 is supported by a supporting member 7 (see FIG. 2) secured in the stretching and blowing stage C of the machine bed 2. The upper central portion of the base plate 3 carries an electric motor 8. As shown in FIGS. 2 and 5, the drive shaft 9 of this motor 8 is fixed to a rotary shaft 10 that is movably held by the base plate 3 and the rotary disk 4. Attached to the rotary shaft 10 is an arm 11 which carries a connecting pin 12 at its free end. The connecting pin 12 is hydraulically operated to engage with the opening 4a of the rotary disk 4 so that the force of the motor 8 is transmitted to the rotary disk 4 through the arm 11 and the connecting pin 12. Neck molds 13 are attached to the peripheral under-surface of the rotary disk 4. Each set of the neck mold halves 13 has a pair of mold cavities and opened in the direction of the radius which passes through each stage. In the positions of the rotary disk 4 corresponding to the parison supporting portions of the neck molds 13, insertion openings 14 are defined, each of which corresponds to each of the guide openings 15 formed in the respective stages of the base plate 3.

A mold closing mechanism $A_1$, a heating core inserting mechanism $B_1$, a stretching and blowing mechanism $C_1$ and a releasing mechanism $D_1$ are formed on the base plate 3 in the respective stages. Further, the cores or pins of the above mechanisms can be moved through the above guide openings 15 having soft metal bushes 15a and the insertion openings 14 of the rotary disk 4.

Each operation stage will be further described in the following.

Figure 4:
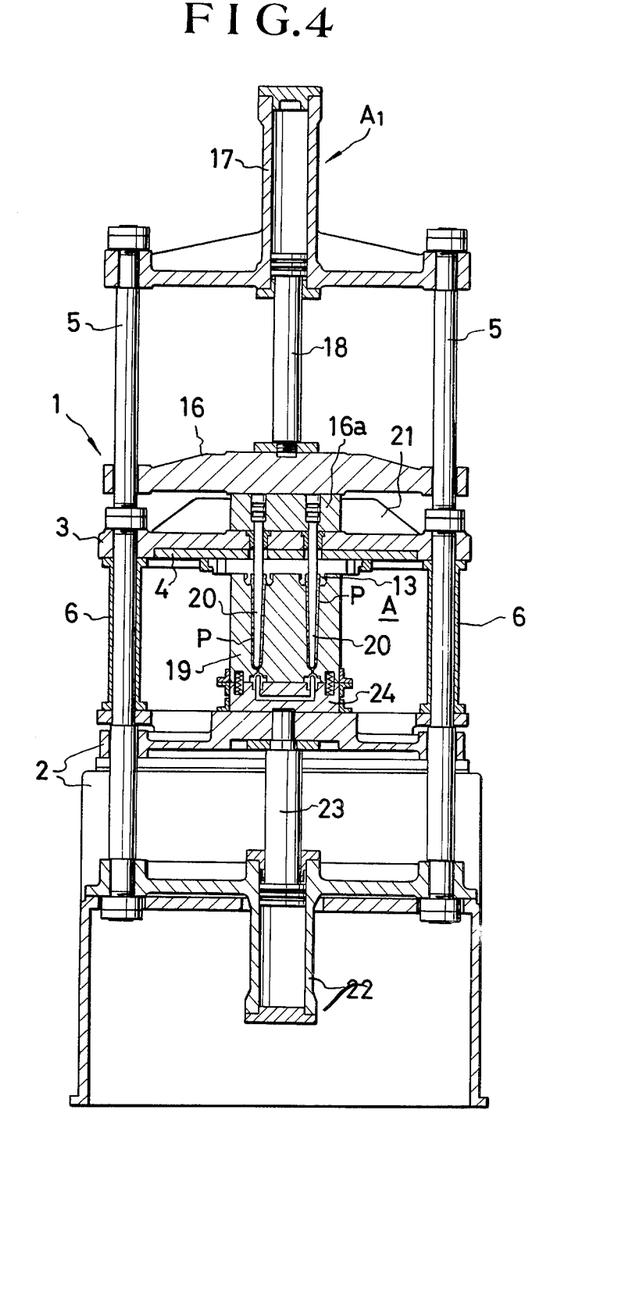
FIG. 4 is also a vertical sectional view of the same taken on the line IV—IV in FIG. 1.
Figure 5:
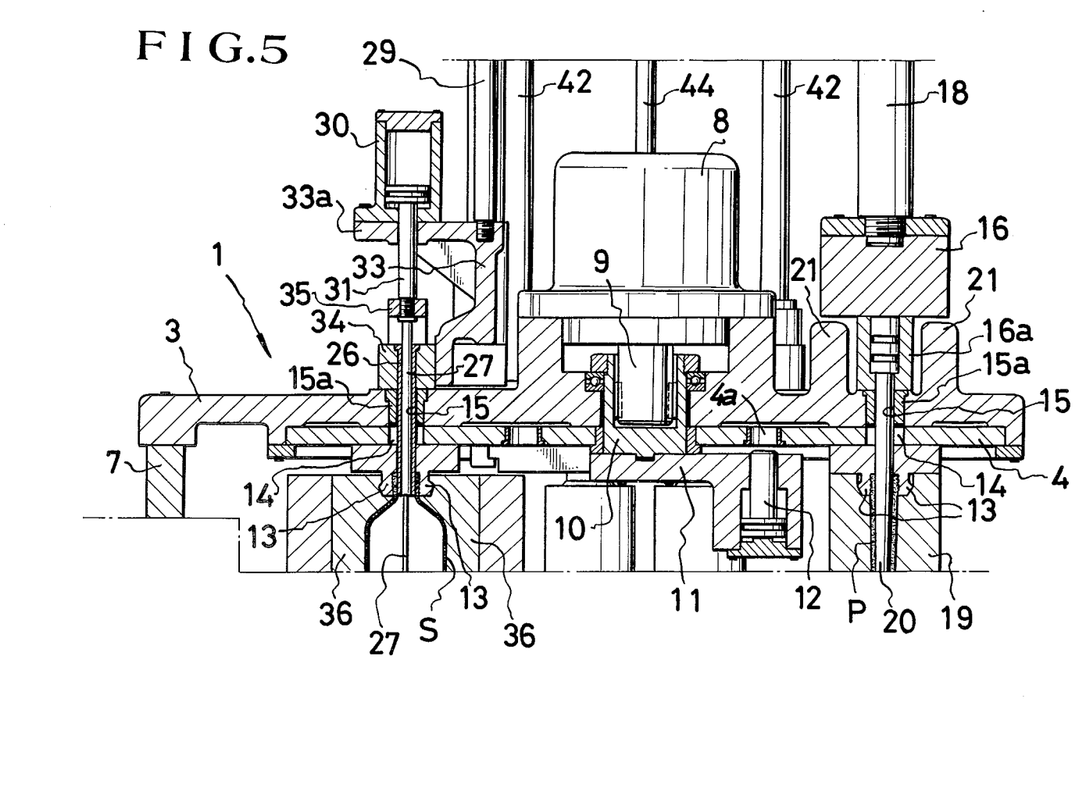
FIG. 5 is an enlarged cross-sectional view of the upper part of FIG. 2.

As shown in FIGS. 2, 4 and 5, the mold closing mechanism $A_1$ of the injection stage A comprises a movable plate 16 that is vertically movable along the tie rods 5 supporting the base plate, a mold closing cylinder 17 attached to the tip ends of the tie rods 5, and a ram 18 disposed between the movable plate 16 and the mold closing cylinder 17. A mold supporting member 16a carries by its under-surface a pair of parison cores 20 which are inserted into the injection mold 19 being in contact with the neck mold 13. The upper surface of the base plate 3 is provided with a pair of reinforcing ribs 21 which are disposed perpendicularly with respect to the radius of the plate 3. The above-mentioned mold supporting member 16a is placed in the space between these reinforcing ribs 21 on the upper-surface of the base plate 3.

The injection mold 19 is attached to the ram 23 of a mold clamping cylinder 22 by means of a runner plate 24. The mold clamping cylinder 22 is vertically attached to the machine bed 2 and the runner plate 24 is brought into contact with the nozzle of an injection device 25.

In FIG. 2, the stretching and blowing mechanism $C_1$ is disposed in the stretching and blowing stage C opposite to the injection molding stage A of the base plate 3. The stretching and blowing mechanism comprises a hydraulic cylinder 28 to move down stretching and blowing cores 27 together with guide tubes 26 into the neck mold, its plunger 29, a hydraulic cylinder 30 to move up only the stretching and blowing cores 27 and attached to the lower end of the plunger 29, and another plunger 31 of the latter cylinder 30.

Figure 7:
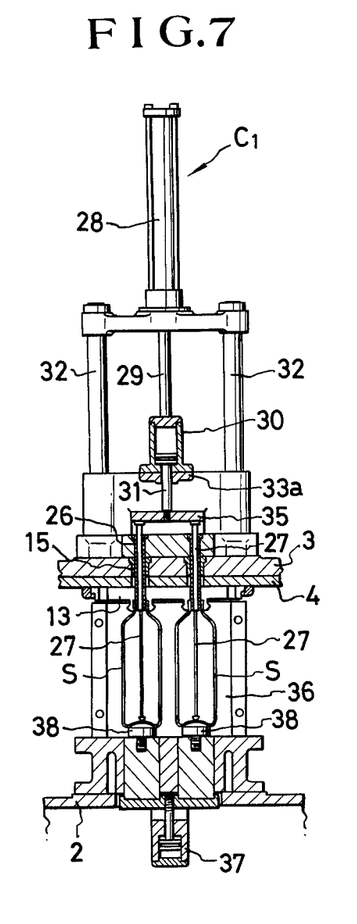
FIG. 7 is a vertical sectional view of the stretching and blowing stage.

As shown in FIGS. 5 and 7, the hydraulic cylinder 28 is fixed to a pair of rods 32 which is set up on the base plate 3. To the lower end of the plunger 29 is attached a supporting member 33 which carries the above guide tubes 26 and the hydraulic cylinder 30. The guide tubes 26 hold the stretching and blowing cores 27 vertically and slidably, and they are inserted into the guide holes 15 and other holes formed in a block 34 on the upper side of the guide holes 15. The stretching and blowing cores 27 are attached to the lower end of the plunger 31 of the hydraulic cylinder 30 with a holder 35 and the cylinder 30 is supported by the shelf 33a above the block 34.

As shown in FIG. 2, a blow mold 36 is disposed in the space between the rotary disk 4 and the machine bed 2. The blow mold 36 is opened or closed in the radial direction and operated together with the neck molds 13. To the bottom of the blow mold 36 is attached a bottom mold 38 which is operated by a hydraulic device 37 fixed to the machine bed 2. The hydraulic device for operating the blow mold 36 consists of a pair of radially directed hydraulic cylinders 39a and 39b, and their rams 40a and 40b. The hydraulic cylinder 39a on the outside is secured to the above-mentioned supporting member 7, while the inner hydraulic cylinder 39b is attached to a supporting member 41 which is formed in a position near the injection mold 19.

Figure 3:
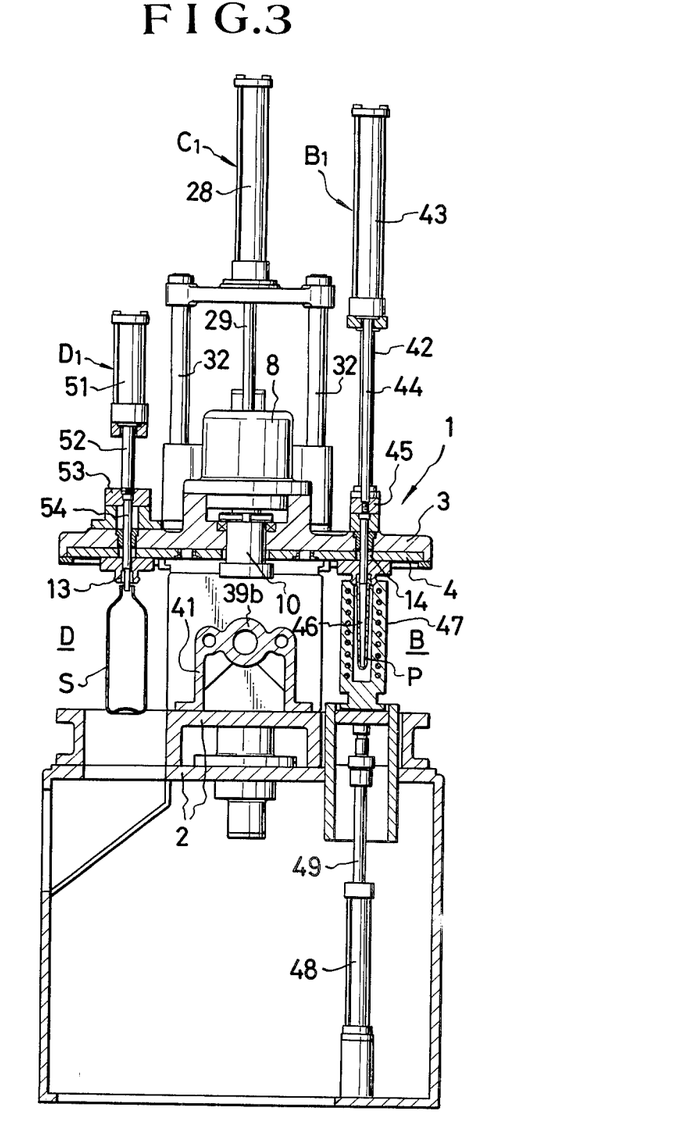
FIG. 3 is a vertical sectional view of the same taken on the line III—III in FIG. 1.
Figure 6:
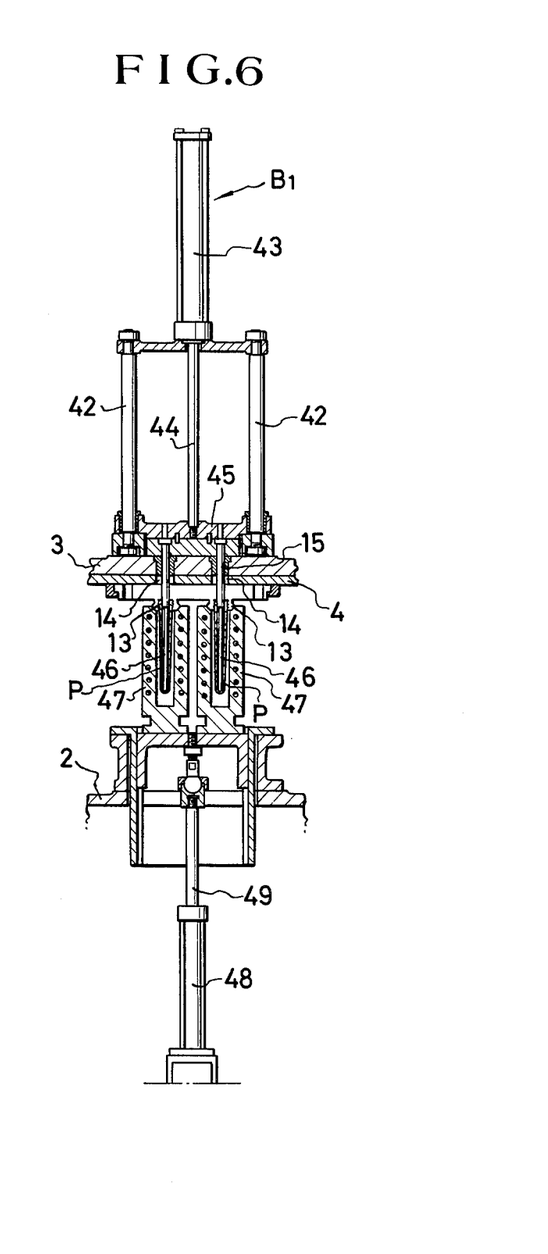
FIG. 6 is a vertical sectional view of the main portion of the heating stage.

As shown in FIGS. 3 and 6, the heating core inserting mechanism $B_1$ in the heating stage B is provided with a hydraulic cylinder 43 that is attached to the top ends of a pair of rods 42 set up on the base plate 3 and heating cores 46 that are attached to the lower end of a plunger 44 of the cylinder 43 by using an attachment 45. Each heating core 46 is inserted into the center of a heating cylinder 47 placed between the machine bed 2 and the rotary disk 4, through the guide hole 15 in the base plate 3 and the opening 14 in the rotary disk 4. The heating cylinder 47 is supported by the plunger 49 of a hydraulic elevating device 48 which is vertically fixed to the machine bed 2. When the neck mold 13 is positioned just below the guide holes 15 in the stoppage of the rotary disk 4, the heating cylinders 47 are raised by the hydraulic pressure of the elevating device 48.

Figure 1:
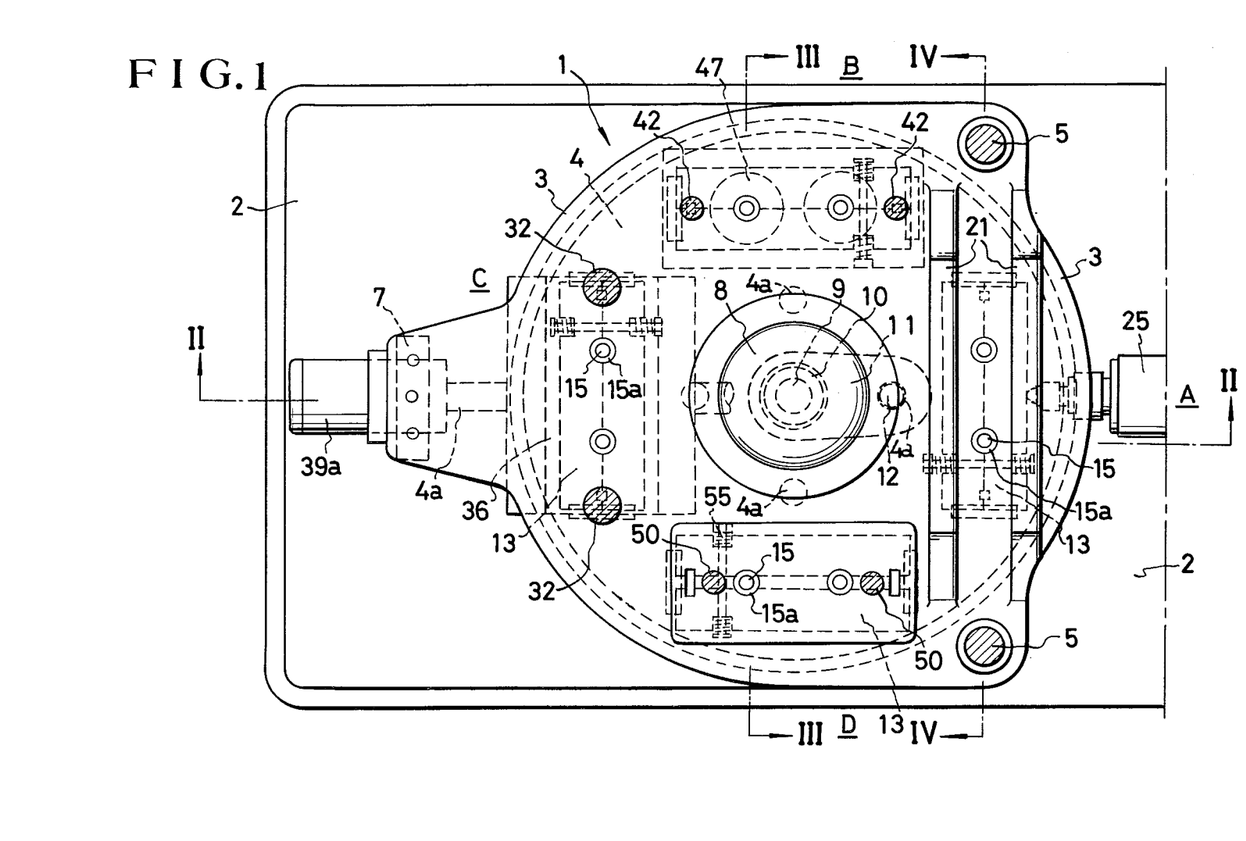
FIG. 1 is a plan view of an embodiment of the present invention which is taken on the horizontal plane above the base plate of the machine.
Figure 8:
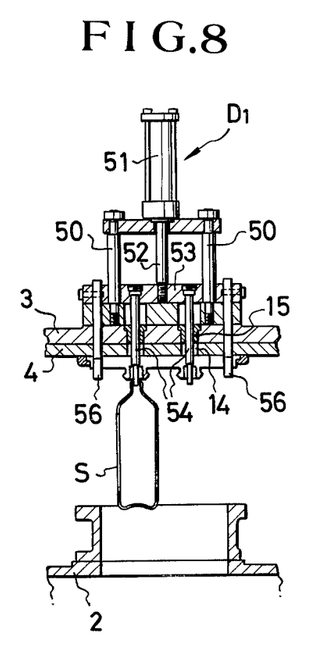
FIG. 8 is a vertical sectional view of the molded product releasing stage.

The releasing mechanism $D_1$ of the releasing stage D is disposed on the opposite side to the heating stage B of FIG. 3. As shown in FIG. 8, the releasing mechanism $D_1$ comprises a hydraulic cylinder 51 which is attached to the tip ends of a pair of rods 50 set up on the base plate 3, its plunger 52, and a plate 53 which is attached to the free end of the plunger 52. The plate 53 is provided with a pair of blow-off pipes 54 which are inserted into molded aritcles S suspended from the neck mold 13, through the above-mentioned openings 14 and the guide holes 15, and a pair of wedge rods 56 to split the neck mold 13 which is closed by the pressure of springs 55 (FIG. 1).

The rotary disk 4 is rotated by the driving force of the motor 8 through the engagement of the connecting pin 12. That is, the rotary disk 4 is intermittently turned for every 90° with the alternating movement of the drive shaft 9 of the motor 8 (torque actuator) and the engagement and disengagement of the connecting pin 12. At each stoppage of the rotary disk 4, the devices in the operation stages are worked all at once.

In the following, the operations of the mechanisms in every stages will be described in the order of molding cycles.

INJECTION MOLDING STAGE A

Figure 9:
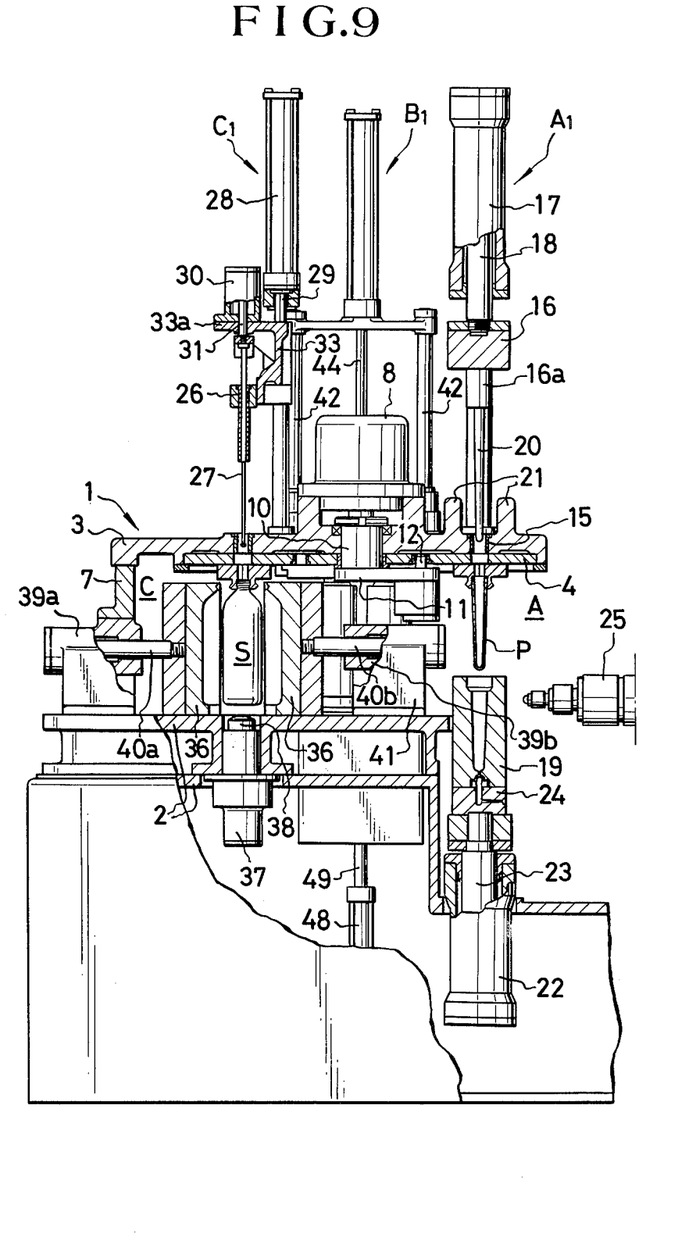
FIG. 9 is a vertical sectional view of the portion like that in FIG. 2, in the state when the rotary disk is shifted to the next stage after the molding.

When the rotary disk 4 is stopped and the neck molds 13 are set to the normal positions, the injection mold 19 is raised by the mold clamping cylinder 22, thus it is brought into contact with the neck mold 13. Then, the parison cores 20 are inserted into the injection mold 19 by the working of the mold closing cylinder 17 to complete the mold closing operation. The mold clamping cylinder 22 is further pressurized after the mold closing and the injection nozzle is brought into contact with the injection mold 19. The molten resin is then fed into the cavity of the mold to form parisons P. After the injection of the material, the injection mold 19 and the parison cores 20 are moved back to the original positions as shown in FIG. 9, in which the neck mold 13 still carries the parisons P. The rotary disk 4 is then turned by 90 degrees to the heating stage B.

HEATING STAGE B

Figure 10:
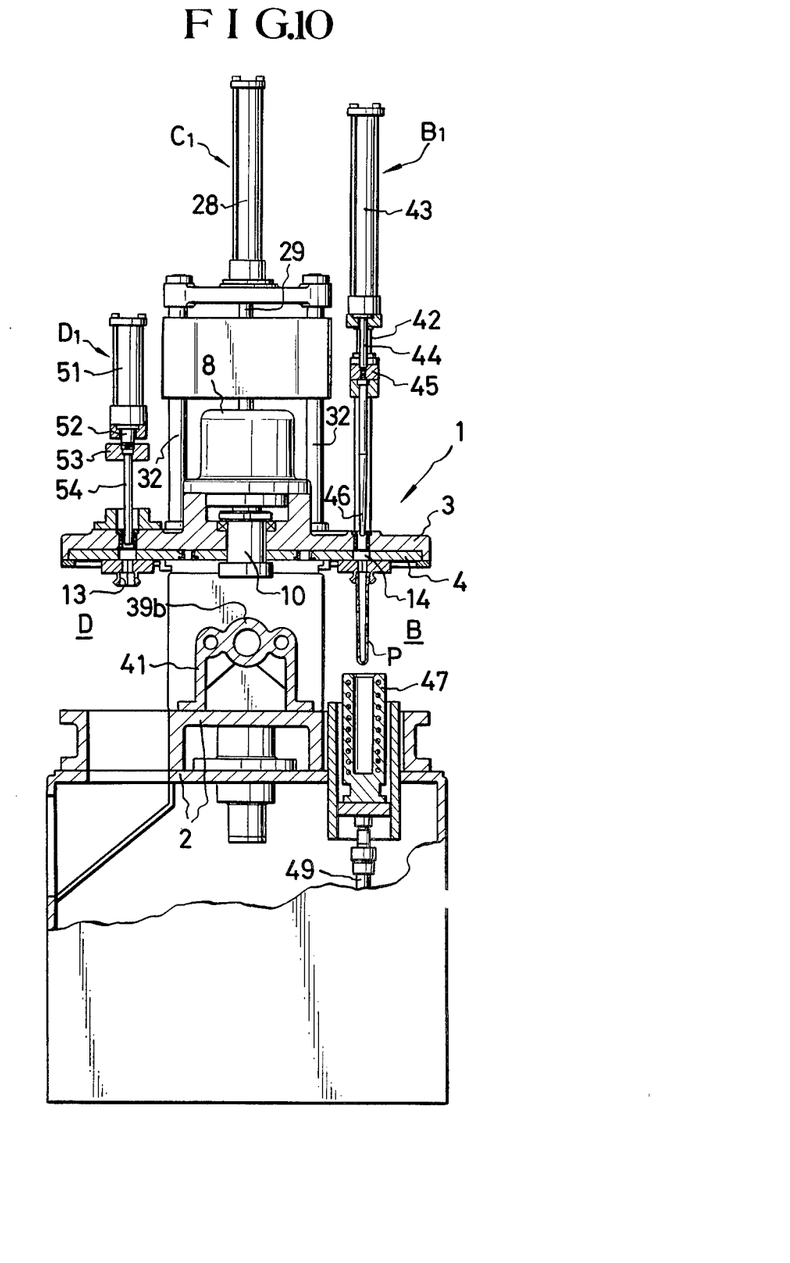
FIG. 10 is a vertical sectional view of the portion like FIG. 3, in the state when the rotary disk is shifted to the next stage.

When the rotary disk 4 is stopped, the neck mold 13 with the parisons P is positioned right above the heating cylinders 47, and the hydraulic cylinder 43 is actuated to lower the plunger 44 so that the heating cores 46 are inserted into the parisons P through the above-described guide openings 15, insertion openings 14 and the bores of the neck mold 13. Then, with the operation of the elevating device 48, the plunger 49 raises the heating cylinders 47 until it reaches the neck mold 13. Thus the parisons P are covered by the heating cylinders 47 and heated to a predetermined temperature. After the heating, the heating cores 46 and the heating cylinders 47 are returned to the original positions as shown in FIG. 10. The rotary disk 4 is then turned to the next stage by 90°.

STRETCHING AND BLOWING STAGE C

When the neck mold 13 with the parisons P is stopped at the predetermined position, the blow molds 36 are closed covering the neck mold 13 by the operation of the hydraulic cylinders 39a and 39b. While, on the base plate 3, the hydraulic cylinder 28 is operated to lower the plunger 29, so that the stretching and blowing cores 27 carrying the guide tubes 26 attached to the supporting member 33 are inserted into the neck mold 13 through the guide openings 15 having soft metal bushes 15a. With this movement, the stretching and blowing cores 27 are put into the parisons P, thus the cores 27 are further lowered with the plunger 31 by the operation of the hydraulic cylinder 30. Therefore, the parisons P are stretched in their axial directions. In synchronism with this stretching, the parisons P are supplied with blown air so that they are expanded within the blow molds 36 to form hollow products S. After the blowing, the blow molds 36 and the cores 27 are moved back to their original positions as shown in FIG. 9, and the neck mold 13 carrying the products S is shifted to the next stage by the rotation of the rotary disk 4.

RELEASING STAGE D

When the above neck mold 13 on the rotary disk 4 is stopped in this stage, the plunger 52 is lowered by the action of the hydraulic cylinder 51 and thus the blow-off pipes 54 are inserted into the molded products S and the wedge rods 56 are pushed forth between the mold halves of the neck mold 13 to open them. When the molded products S are blown off, the blow-off pipes 54 and the wedge rods 56 are retracted to the original positions as shown in FIG. 10. Then the rotary disk 4 is turned to the next injection molding stage A to be operated in the new cycle.

In case that the bottoms of the molded products become cloudy owing to sprues formed on the bottoms of injection molded parisons, they may be cut off before the parisons are heated. This sprue cutting can be easily carried out by providing a sprue cutting device between the injection molding stage and the heating stage, in which device a cutter having a heater is projected at the position of the bottoms of parisons and it is brought into contact with the sprues.

As disclosed above, a rotary disk is rotatably supported on the under surface of a base plate which is disposed above the machine bed leaving a certain distance apart and the disk having neck molds is turned for a certain angle by the motor which is fixed to the center of the base plate. Therefore, the space between the machine bed and the base plate can be fully used for the molding stages, which makes it possible to reduce the overall diameter of the molding machine as compared with the similar machines in the conventional art. Further, the hydraulic cylinders for blow molds can be built in the machine body since there is no obstacle such as supporting shaft under the base plate. Furthermore, the injection mold is disposed below the rotary disk and the parisons can be directly supported by the neck molds, so that it is not necessary to provide the means for transferring parisons that are held outside the rotary disk and the molding operations can be performed continuously only by rotating the rotary disk.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. An injection blow molding machine comprising:
   a machine bed having a substantially horizontal surface for mounting the operating stages of the molding machine thereon;
   four operation stages being disposed on the horizontal surface of the machine bed, such stages being an injection molding stage, a heating stage, a stretching and blowing stage and a releasing stage;
   a base plate disposed parallel to and above the horizontal surface of the machine bed;
   a rotary disk rotatably attached to the under-surface of the base plate;
   the rotary disk being provided with four neck molds, each of said neck molds being disposed correspondingly to one of said operation stages;
   a motor secured to a middle portion of said base plate, said motor having a drive shaft which passes through the rotary disk;
   an arm attached at one end thereof to the lower end of the drive shaft of the motor and at the other end thereof to a connecting pin, the connecting pin means being engagable with the rotary disk to intermittently rotate the rotary disk to respective ones of said operation stages;

a mold closing mechanism associated with the injection molding stage;
a heating core inserting mechanism associated with the heating stage to heat a parison from the injection molding stage;
a stretching and blowing mechanism associated with the stretching and blowing stage to stretch and blow the heated parison from the heating stage;
a molded product releasing mechanism associated with the releasing stage to release the stretched and blown molded product from the stretching and blowing stage;
the mold closing mechanism, heating core, stretching and blowing mechanism, and product releasing mechanism being secured on the periphery of the base plate and positioned respectively in the injection molding, heating, stretching and blowing, and releasing stages;
injection mold, blow molds and heating cylinders being disposed in the space between the machine bed and the base plate; and
hydraulic means associated with each of said mechanisms for the selective actuation thereof.

2. The injection blow molding machine of claim 1, further including a parison core asociated with the mold closing mechanism of the injection molding stage, a heating core associated with the heating cylinder, stretching and blowing cores respectively associated with the blowing molds and the blow-off tubes associated with the releasing stage, each mechanism being actuated by its associated hydraulic mechanism when the rotary disk is stopped, to vertically move said cores and blow-off tubes through the base plate and rotary disk.

3. The injection blow molding machine of claim 1, wherein the upper surface of said base plate is provided with a plurality of reinforcing ribs perpendicularly disposed to the radius of said plate.

4. The injection blow molding machine of claim 1, further including a mold clamping cylinder secured to the machine bed, the mold clamping cylinder including a piston or ram having an upper end connected to the injection mold, to provide vertical movement of the injection mold toward and from the neck mold which is secured to the rotary disk.

* * * * *

UNITED STATES PATENT AND TRADEMARK OFFICE
CERTIFICATE OF CORRECTION

PATENT NO. : 4,105,391
DATED : August 8, 1978
INVENTOR(S) : Katashi Aoki

It is certified that error appears in the above-identified patent and that said Letters Patent are hereby corrected as shown below:

In Claim 1, Column 6, line 65, insert -- means -- after "pin" and before ", the".

Signed and Sealed this

Thirtieth Day of September 1980

[SEAL]

Attest:

SIDNEY A. DIAMOND

Attesting Officer

Commissioner of Patents and Trademarks